United States Patent [19]

Johnson

[11] Patent Number: 5,498,096
[45] Date of Patent: Mar. 12, 1996

[54] TUBE JOINT FORMED WITH ADHESIVE AND METAL FORMING PROCESS

[75] Inventor: James A. Johnson, Brighton, Mich.

[73] Assignee: Hoover Universal, Inc., Plymouth, Mich.

[21] Appl. No.: 330,967

[22] Filed: Oct. 28, 1994

[51] Int. Cl.⁶ .................................................. F16L 13/14
[52] U.S. Cl. .................... 403/267; 403/285; 403/283; 285/915; 297/452.2; 156/91; 29/469.5; 29/527.1; 29/515
[58] Field of Search ..................... 403/265, 266, 403/267, 279, 281, 283, 282, 274, 285; 285/172, 290, 289, 334.5, 915; 297/452.2, 452.18; 156/91, 92; 29/469.5, 432, 515, 527.1, 527.4

[56] References Cited

U.S. PATENT DOCUMENTS

| | | |
|---|---|---|
| 1,785,587 | 12/1930 | Kuhlmann . |
| 2,234,952 | 3/1941 | Boynton .................................. 285/289 |
| 2,741,498 | 4/1956 | Elliott ...................................... 285/915 |
| 3,586,376 | 6/1971 | Mire ...................................... 297/452.2 |
| 3,635,528 | 1/1972 | Strom .................................... 297/452.2 |
| 3,877,518 | 4/1975 | Dreksler . |
| 3,909,045 | 9/1975 | Meagner ................................. 285/915 |
| 3,937,641 | 2/1976 | Kushner et al. . |
| 4,095,825 | 6/1978 | Butler ...................................... 285/915 |
| 4,168,054 | 9/1979 | Weiland ................................. 403/283 |
| 4,190,479 | 2/1980 | Smith . |
| 4,321,199 | 2/1983 | Kushner et al. ........................ 285/915 |
| 4,902,048 | 2/1990 | Washizo ................................. 285/915 |
| 5,213,008 | 5/1993 | Kanno et al. ........................... 403/267 |
| 5,404,630 | 4/1995 | Wu ............................................ 156/91 |

Primary Examiner—Eric K. Nicholson
Attorney, Agent, or Firm—Harness, Dickey & Pierce

[57] ABSTRACT

A tube joint and seat frame formed with tubes joined with the tube joint of the present invention in which the joint is formed by flaring the end of an outer tube, inserting an inner tube into the outer tube beyond the flare forming a telescoping tube portion in which the outer tube overlaps the inner tube. The clearance formed between the inner and outer tubes by the flare is filled with an epoxy resin adhesive. A metal forming process is performed forming apertures through the inner and outer tubes in the telescoping tube portion in which the aperture in the outer tube is concentric with the aperture in the inner tube and is surrounded by a flange extending radially relative to the axis of the tube into the aperture in the inner tube forming a mechanical interlock between the inner and outer tubes.

13 Claims, 1 Drawing Sheet

TUBE JOINT FORMED WITH ADHESIVE AND METAL FORMING PROCESS

BACKGROUND AND SUMMARY OF THE INVENTION

The present invention relates to a tube joint and a method for forming a tube joint, and in particular to a joint formed with adhesives and a metal forming process.

Numerous methods of joining tubes together have been developed. Many of these methods rely on welding two tubes together in a butt joint. Such a joint works well when the two tubes joined together are of the same material. However, when tubes of different materials am being joined, it is difficult or impossible to form a strong joint by welding. Tube joints with dissimilar materials are often formed using an adhesive compound such as an epoxy resin which is adhesive to both materials. However, an adhesive joint does not always provide the strength necessary when the tubes are being joined together to form a structural system or frame, such as a frame for a seat assembly.

Accordingly, it is an object of the present invention to provide a tube joint and a method for forming the joint which can be used equally well with like materials or dissimilar materials to provide the necessary strength for a structural frame.

The joint of the present invention is formed by first producing a flare at one end of an outer tube. An inner tube is placed within the outer tube, beyond the flare, forming a telescoped portion in which the outer tube overlaps the inner tube, adjacent to the flare. The flare forms a clearance between the inner and outer tubes at the end of the outer tube. An adhesive is disposed in this clearance by placing an annular bead of adhesive around the inner tube prior to inserting the inner tube into the outer tube.

A metal forming process is performed on the tubes at the location of the overlapping inner and outer tubes, producing apertures extending radially through both tubes. The aperture in the inner tube is concentric with the aperture in the outer tube. The aperture in the outer tube is surrounded by a radially inwardly directed flange which extends into the aperture in the inner tube. This flange mechanically interlocks the inner and outer tubes together. The forming process can be performed by a punch, a flow-drill or a similar tool. Several circumferentially spaced sets of apertures can be formed in the tube joint.

The joint thus formed has several advantages. The joint can be used with dissimilar materials or like materials with equal results. In addition, the joint quality is more consistent and the joint is lower in cost than a welded joint.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
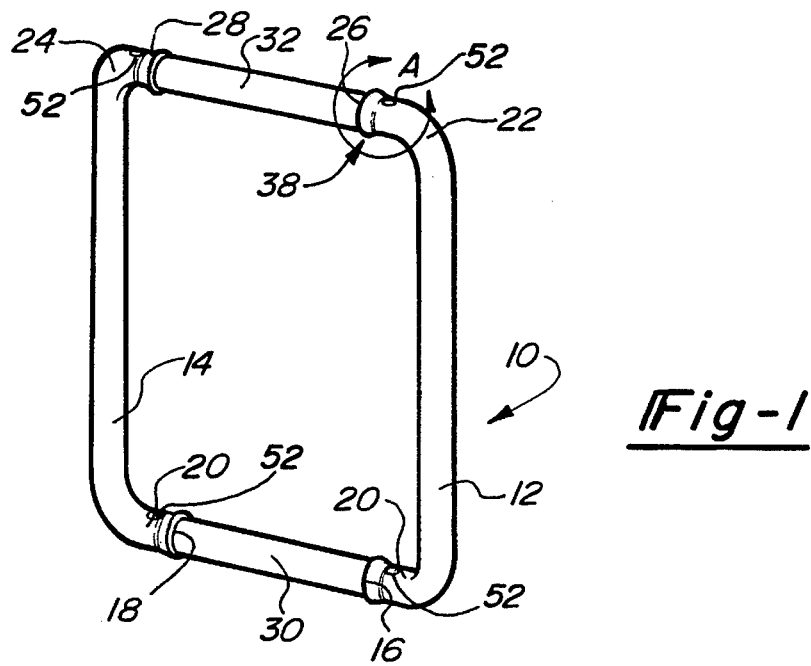
FIG. 1 is a perspective view of a tubular seat back frame constructed with tube joints of the present invention.

A tubular seat back frame constructed with tube joints of the present invention is shown in FIG. 1 and designated generally at 10. The seat back frame 10 has a pair of upright tube members 12, 14 extending generally upwardly on opposite sides of the frame. At their lower ends, each upright member is bent inwardly, terminating in ends 16, 18. At their upper ends, the upright members 12, 14 have bends 22, 24, respectively, in which the tubes are bent inwardly, toward each other, and terminate in ends 26, 28. Mounting hardware, not shown, is coupled to the upright members at their lower ends for mounting the seat back frame 10 to a lower seat frame, also not shown.

A lower tubular cross member 30 has opposite ends inserted into the ends 16, 18 of the upright members. An upper cross member 32 is inserted into the ends 26, 28 of the upright members 12, 14. The upright members and the cross members are joined together with the tube joint of the present invention forming a rigid frame for a seat back of a vehicle seat assembly.

With the seat back frame structure shown, identical upright members 12, 14 can be used with a number of different seat backs, each having a different width. The width of the seat back is determined by the lengths of the cross members 30, 32. By simply changing the lengths of the tubular cross members, seat backs with different widths can be produced using the same upright members 12, 14. This reduces the number of individual components necessary to produce a variety of different width seats.

Figure 2:
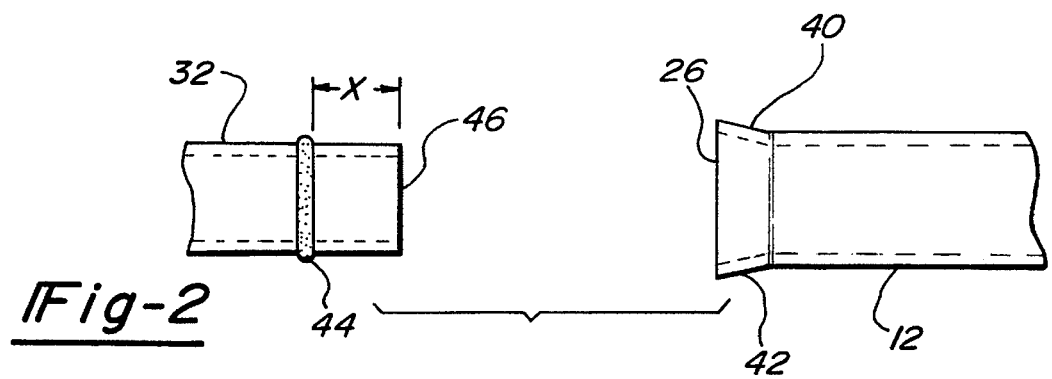
FIGS. 2; 3 and 4 are elevational views of the process of forming the tube joint.
Figure 3:
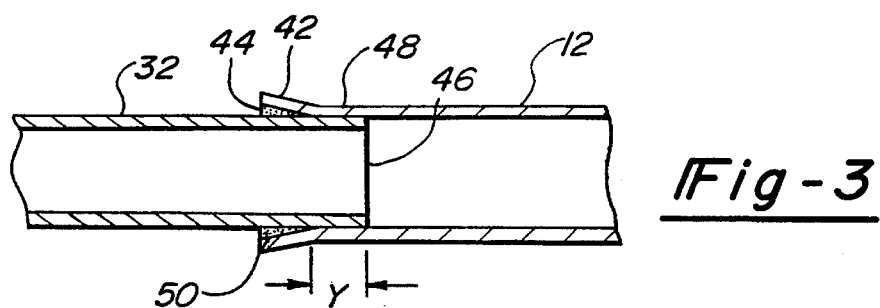
Figure 4:
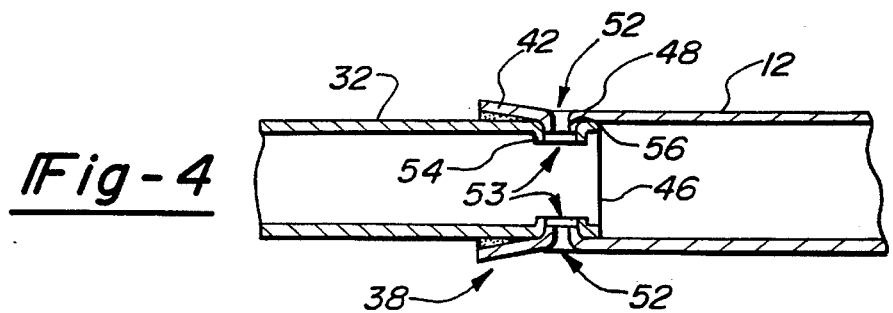

The tube joint of the present invention is shown in greater detail in FIGS. 2–4 in connection with the joint 38 contained within the circle A of FIG. 1. This is the joint at the upper right hand corner of the seat back between the upright member 12 and the upper cross member 32. In the joint 38, the upright tube member 12 is the outer tube, having an inside diameter sized to receive the upper cross member 32, the inner tube.

Prior to formation of the joint 38, the end portion 40 of the upright member 12, adjacent to its end 26, is flared outward, forming a flare 42. An annular bead of adhesive 44 is placed on the upper cross member 32, spaced from the end 47 of the cross member a distance X. The end 46 of the cross member 32 is then inserted into the end of the upright member 12. The cross member tube 32 is inserted beyond the flare 42, forming a telescoped portion 48 in which the outer tube overlaps the inner tube in a close fitting relationship, adjacent to the flare 42. The overlapping telescoping portion has a width of Y.

The distance X, by which the bead of adhesive 44 is set back from the end 46 of the upper cross member 32, is related to dimension Y so that the adhesive bead 44 will be placed within the clearance 50 formed between the inside diameter of the flare 42 and the outside diameter of the cross member 32. The adhesive 44 fills this clearance to seal and join the upright member and cross member together. An epoxy resin adhesive is used as the adhesive 44. When tubes of dissimilar materials are joined, an epoxy that is adhesive to both materials is used.

A metal forming process is then performed on the telescoped portion 48 of the inner and outer tubes, forming an aperture 52 in the outer tube and a concentric aperture 53 in the inner tube. The apertures 52, 53 extend radially through the inner and outer tubes. In describing the apertures, the term "radially" is used in relation to the longitudinal axis of the tubes being joined. The apertures are formed by a flow-drill process which is a combination of a high speed rotary motion, without cutting threads, coupled with a punching motion. The result is the formation of apertures made not by material removal, but by deflecting the material inwardly. This results in an inturned flange 54 in the inner tube or cross member 32 surrounding the aperture 53. In the outer tube, an inturned flange 56 is formed surrounding the aperture 52. The inturned flange 56 in the outer tube projects radially within the aperture 53 in the inner tube. This forms a mechanical interference to prevent both removal of the inner tube from the outer tube and further insertion of the inner tube into the outer tube. The number of such concentric apertures formed in the tubes is dependent upon the desired strength of the tube joint. The joint 38 in FIG. 4 has two sets of apertures 52, 53. While a flow-drill process is preferred, the apertures 52, 53 can also be formed with a punch or similar tool.

The tube joint of the present invention provides a stronger joint than can be formed with adhesives only. The increased strength is from the flow-drill or punch formed apertures. Furthermore, the tube joint, by eliminating the need for welding, enables tubes of dissimilar materials to be joined together. In addition, there is greater consistency in the joint strength than with a welded joint.

It is to be understood that the invention is not limited to the exact construction illustrated and described above, but that various changes and modifications may be made without departing from the spirit and scope of the invention as defined in the following claims.

I claim:

1. A tube joint comprising:

an outer tube having a flared end formed by a flare;

an inner tube having two ends and an outside diameter sized to fit within said outer tube, one end of said inner tube being disposed within said flared end of said outer tube with an end portion of said inner tube extending into said outer tube beyond said flare, forming a telescoping tube portion in which said outer tube overlaps said inner tube immediately adjacent said flare, said flare forming a clearance between said inner and outer tubes;

an adhesive disposed in said clearance between said inner and outer tubes formed by said flare; and said tubes having concentric apertures extending radially through said inner and outer tubes at said telescoping tube portion, said aperture in said outer tube being surrounded by an inwardly directed flange which extends into said aperture in said inner tube.

2. The tube joint of claim 1 wherein said aperture in said inner tube is surrounded by an inwardly directed flange which extends into said inner tube.

3. The tube joint of claim 1 wherein said inner and outer tubes are of the same materials.

4. The tube joint of claim 1 wherein said inner and outer tubes are of dissimilar materials.

5. A seat frame comprising first and second elongated tubes each having two ends, said second tube having an outside diameter less than an inside diameter of said first tube, said first tube having a flare at one end and said second tube having one end disposed in said one end of said first tube beyond said flare forming a telescoping tube portion in which said first tube overlaps said second tube immediately adjacent said flare, said flare forming a clearance between said first and second tubes, an adhesive disposed in said clearance between said first and second tubes formed by said flare, and said tubes having concentric apertures extending radially through said first and second tubes at said telescoping tube portion, said aperture in said first tube being surrounded by an inwardly directed flange which extends into said aperture in said second tube.

6. The tube joint of claim 5 wherein said aperture in said second tube is surrounded by an inwardly directed flange which extends radially into said second tube.

7. The tube joint of claim 5 wherein said first and second tubes are of the same materials.

8. The tube joint of claim 5 wherein said first and second tubes are of dissimilar materials.

9. The method of joining two tubes together in an end to end relationship comprising the steps of:

providing outer and inner tubes each having two ends with said inner tube having an outside diameter sized to fit closely within said outer tube;

forming a flare in one end of said outer tube;

inserting one end of said inner tube into said one end of said outer tube beyond said flare forming a telescoping tube portion in which said outer tube overlaps said inner tube adjacent said flare, said flare forming a clearance between said inner and outer tubes;

placing an adhesive in said clearance between said inner and outer tubes formed by said flare; and forming concentric apertures extending radially through said inner and outer tubes at said telescoping tube portion, said aperture in said outer tube being surrounded by an inwardly directed flange which extends into said aperture in said inner tube.

10. The method of claim 9 wherein said apertures extending radially through said tubes are formed by a flow-drill process.

11. The method of claim 9 wherein said apertures extending radially through said tubes are formed by a punch process.

12. The method of claim 9 wherein said adhesive is placed in said clearance by first placing an annular bead of said adhesive on said inner tube prior to inserting said one end of said inner tube into said one end of said outer tube.

13. The method of claim 9 further comprising the step of forming additional concentric apertures through said inner and outer tubes.

* * * * *